L. C. PALMER.
BOX MAKING AND COVERING MACHINE.
APPLICATION FILED JAN. 31, 1911. RENEWED APR. 3, 1919.

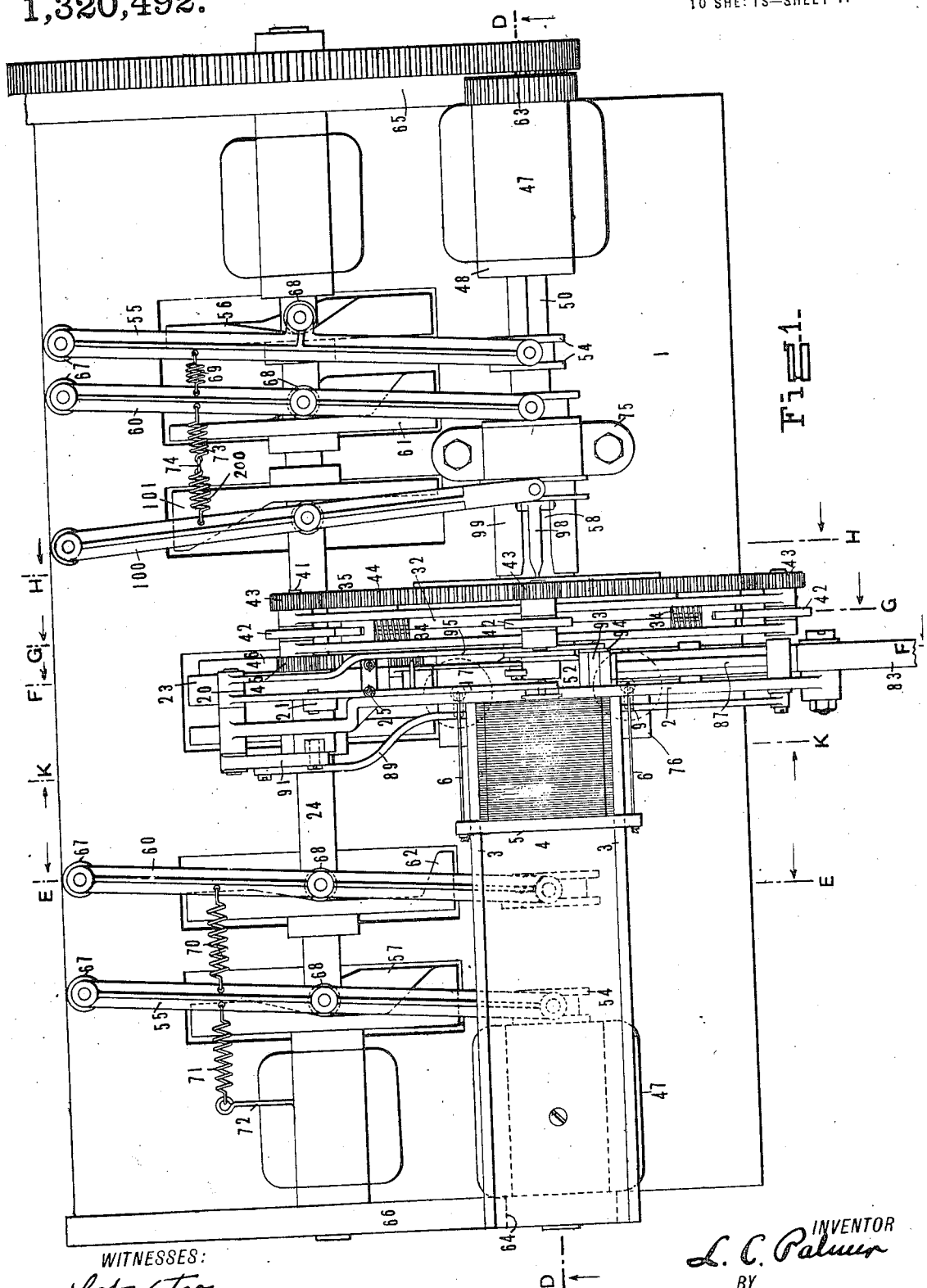

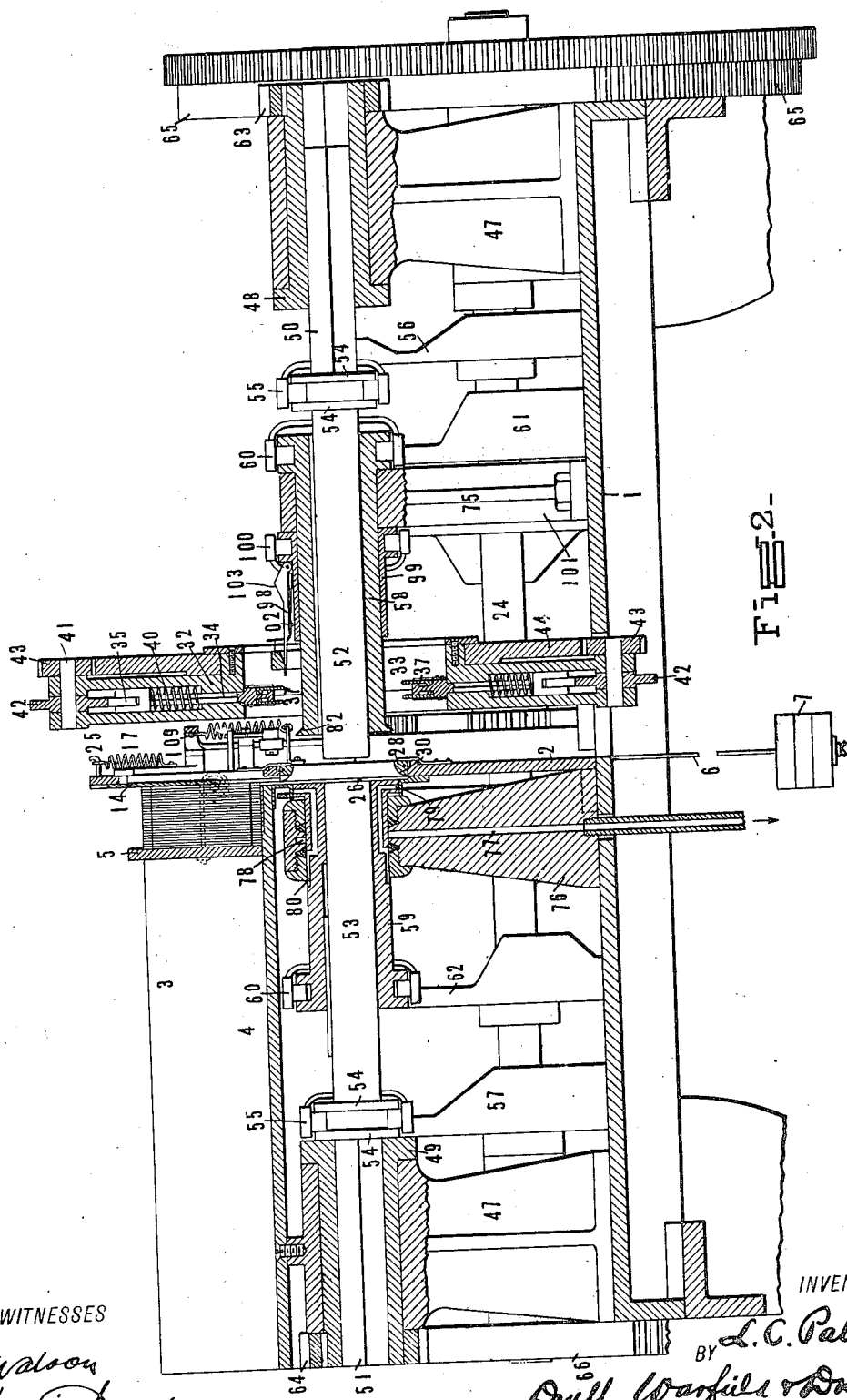

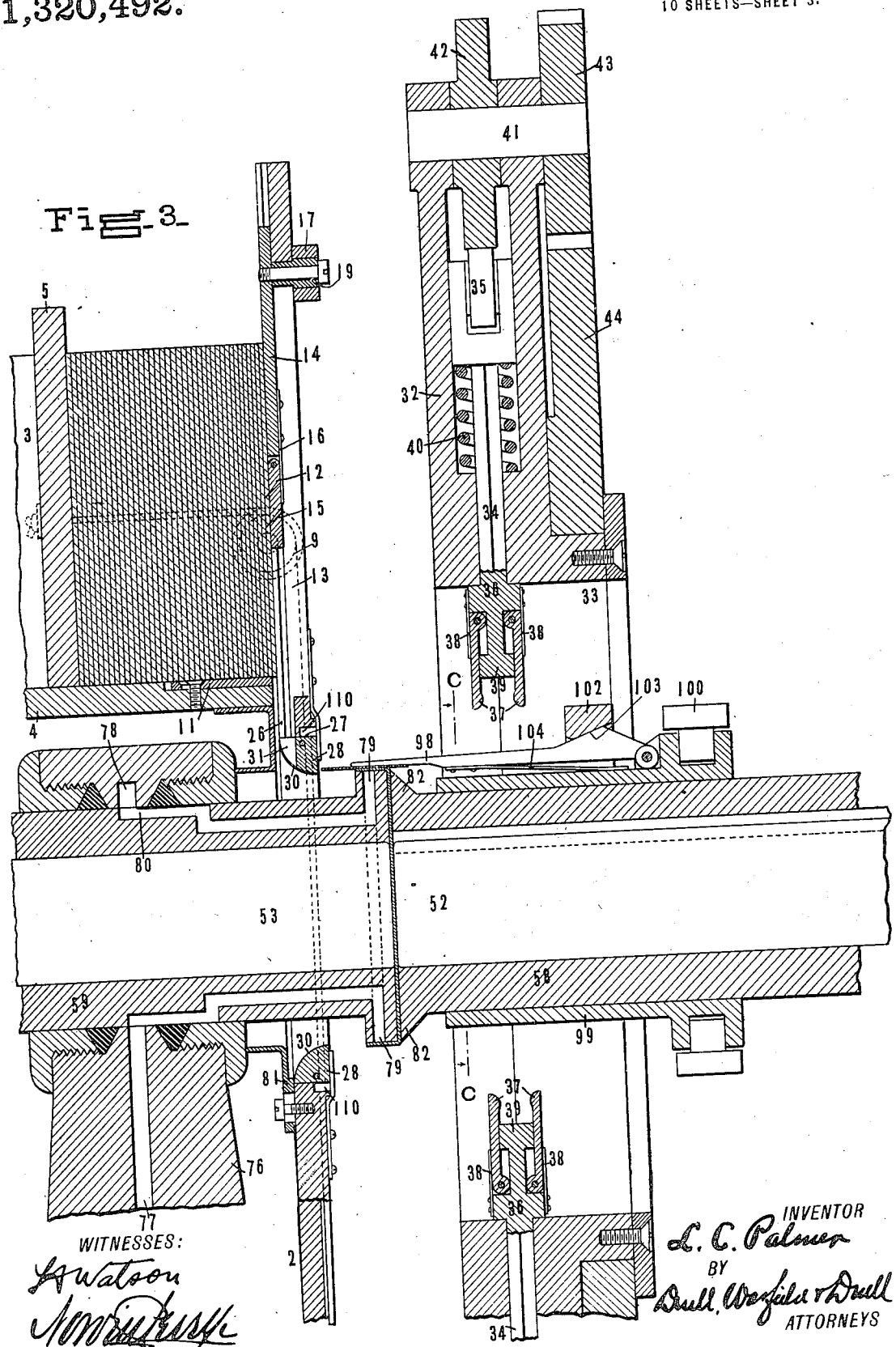

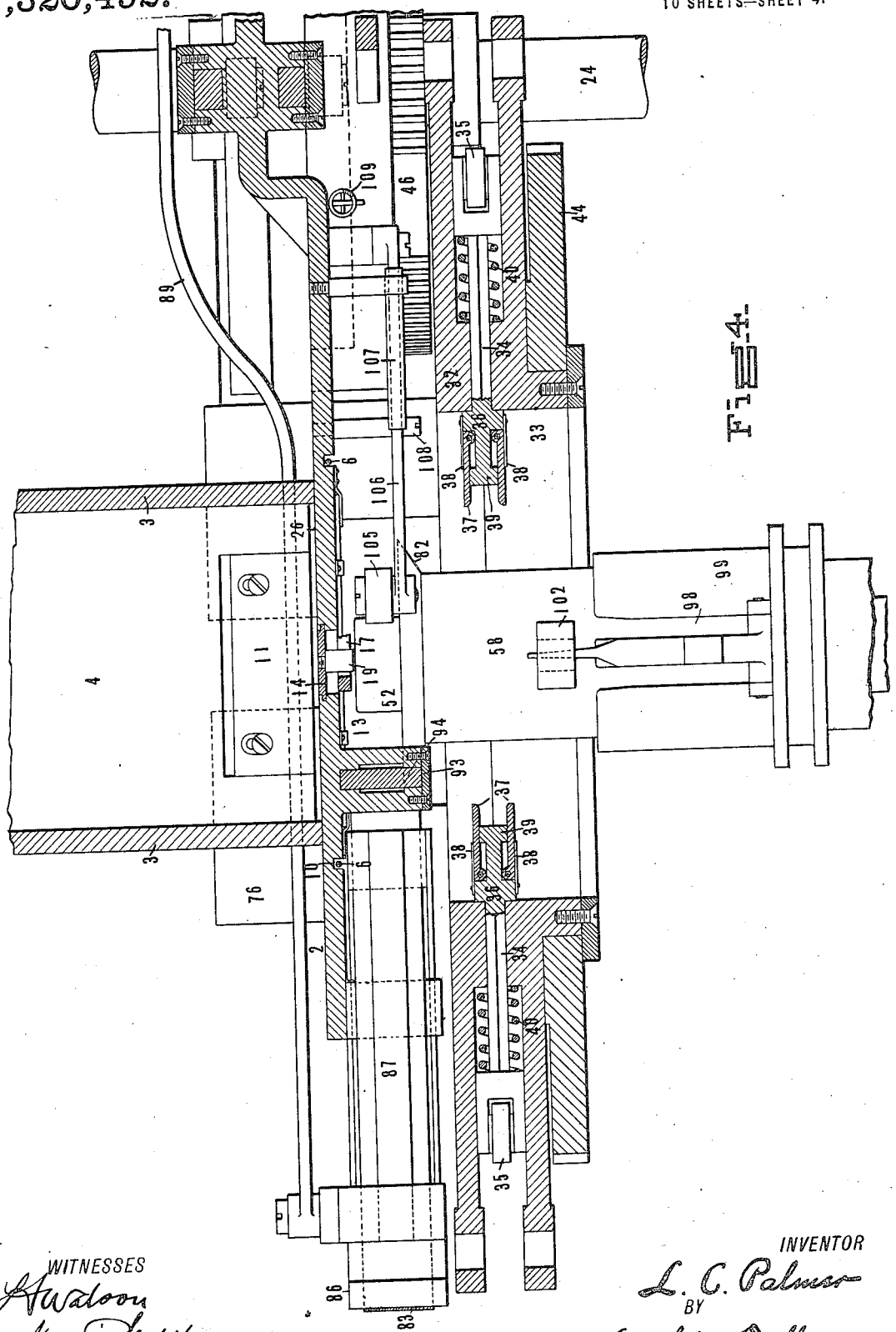

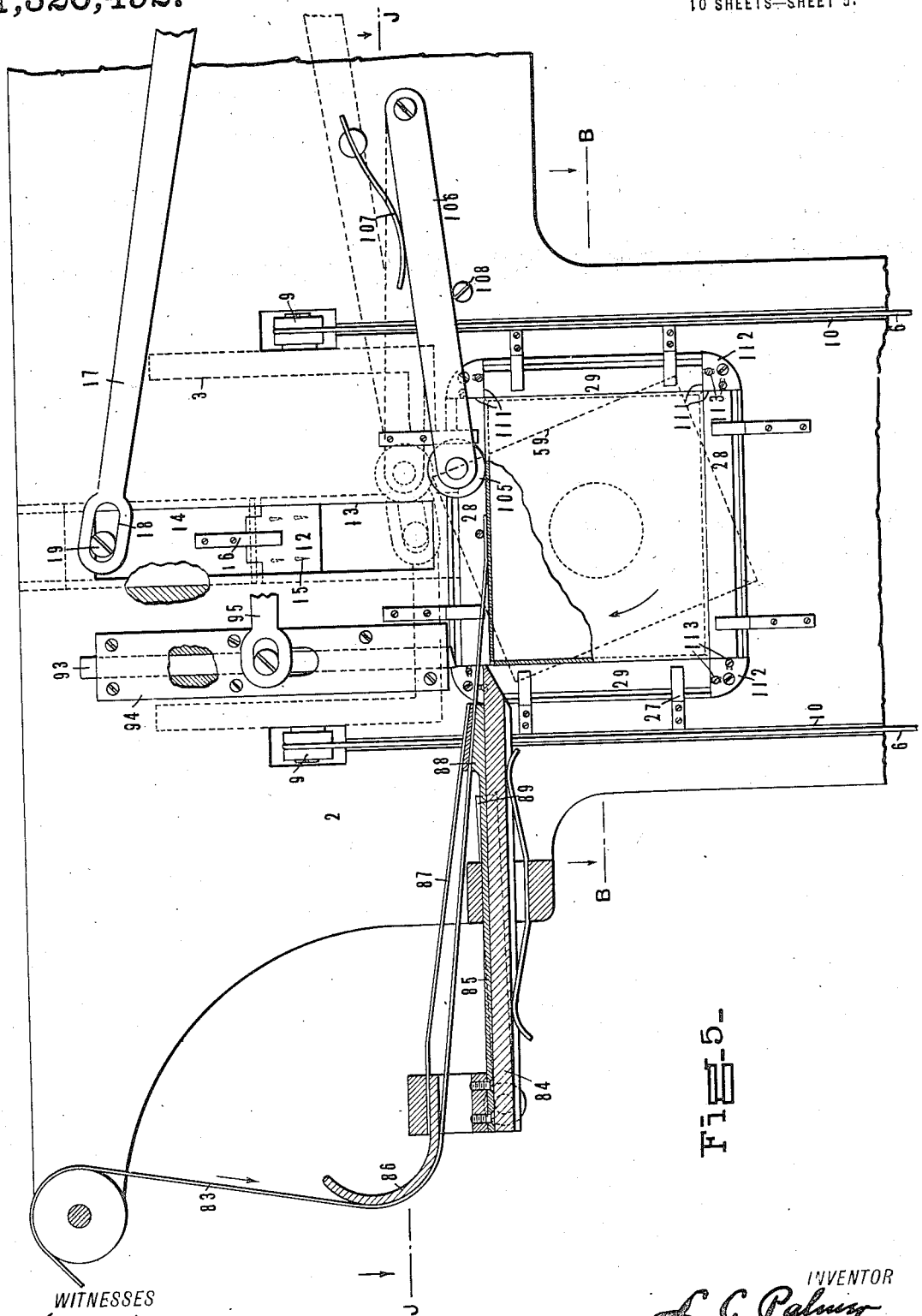

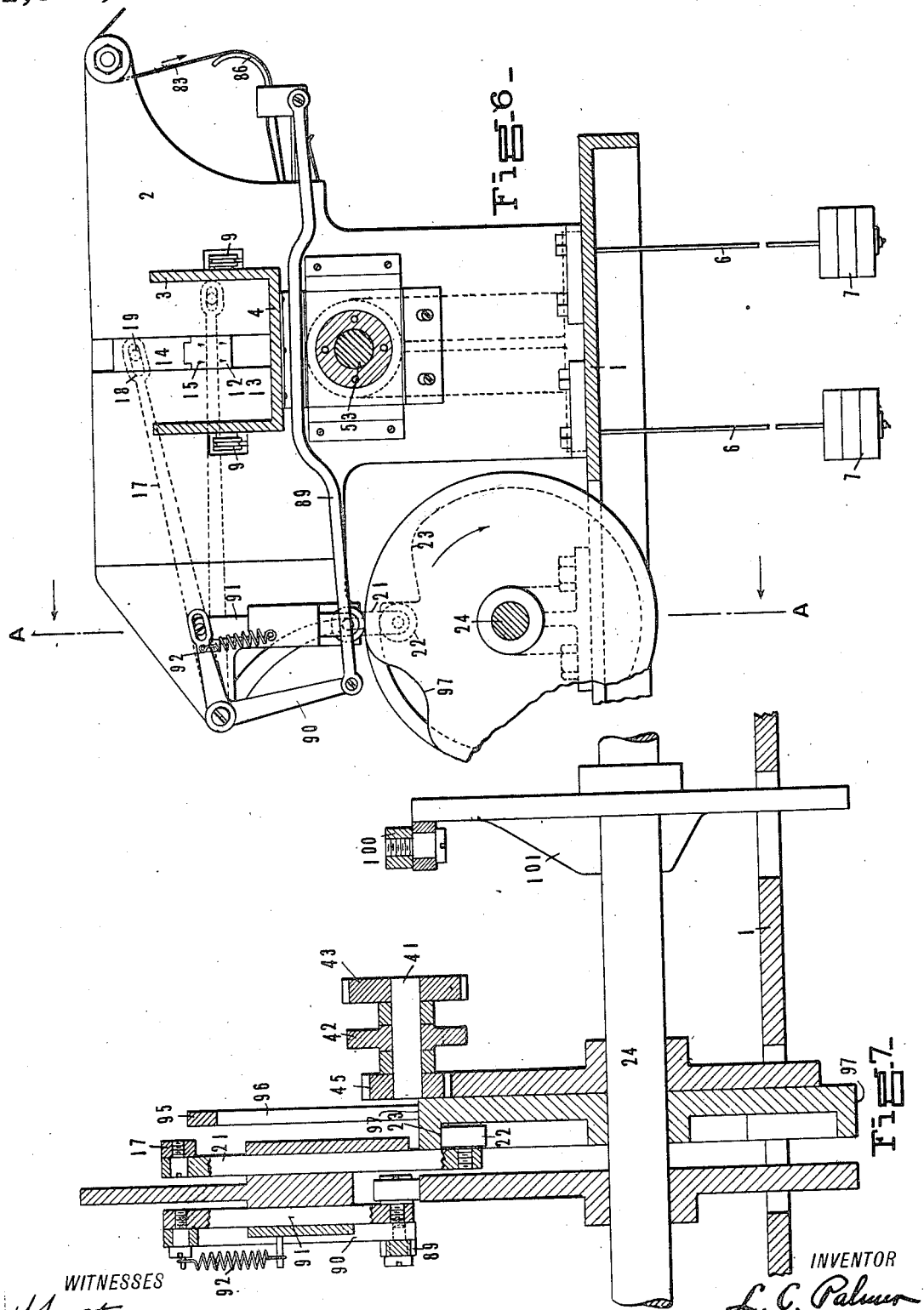

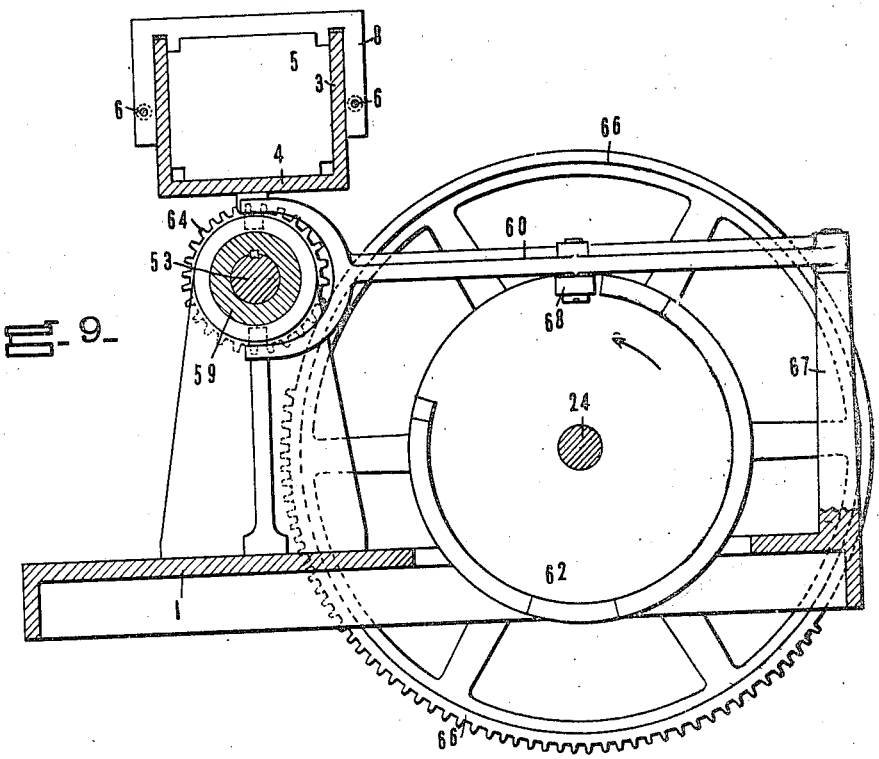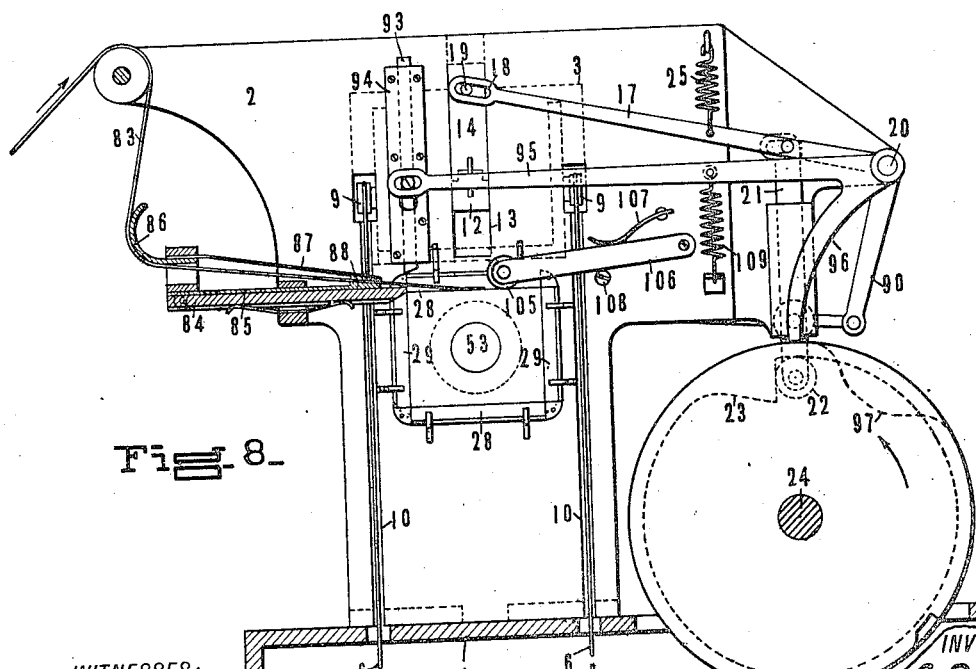

1,320,492.

Patented Nov. 4, 1919.
10 SHEETS—SHEET 8.

L. C. PALMER.
BOX MAKING AND COVERING MACHINE.
APPLICATION FILED JAN. 31, 1911. RENEWED APR. 3, 1919.
1,320,492.
Patented Nov. 4, 1919.
10 SHEETS—SHEET 9.
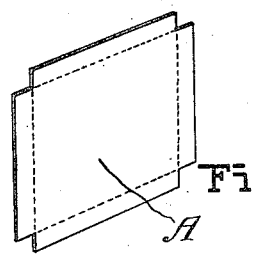
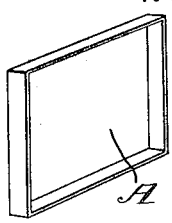
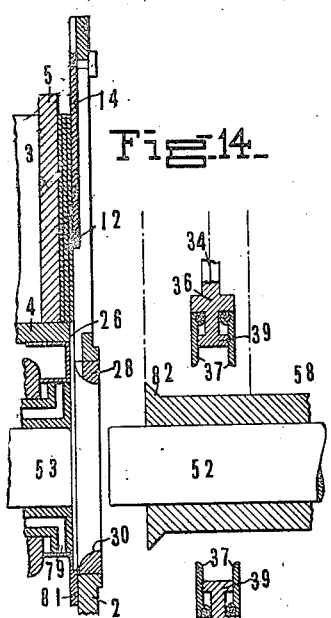
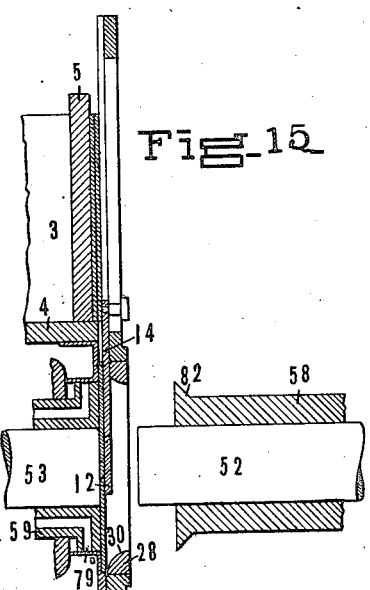
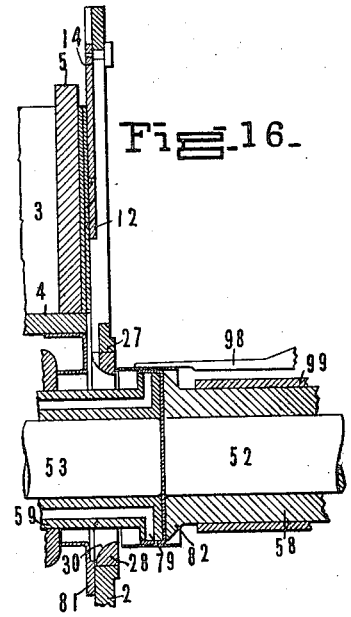
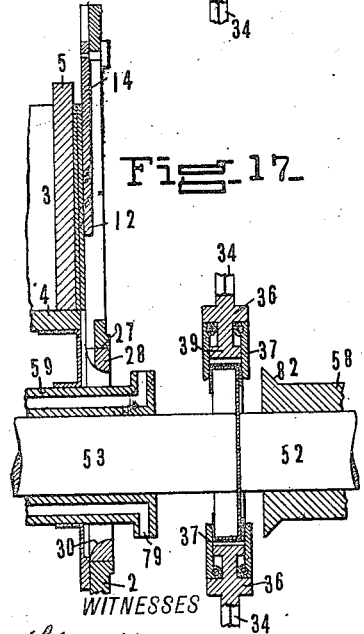
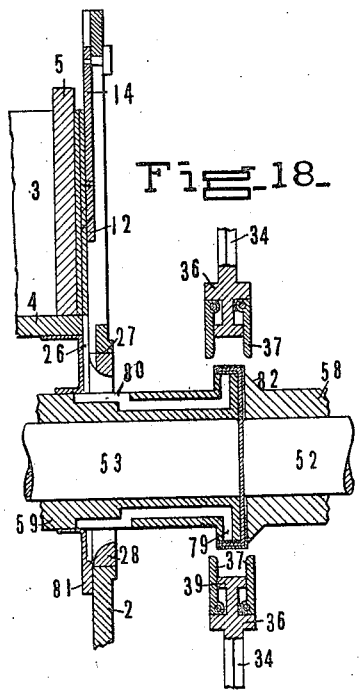
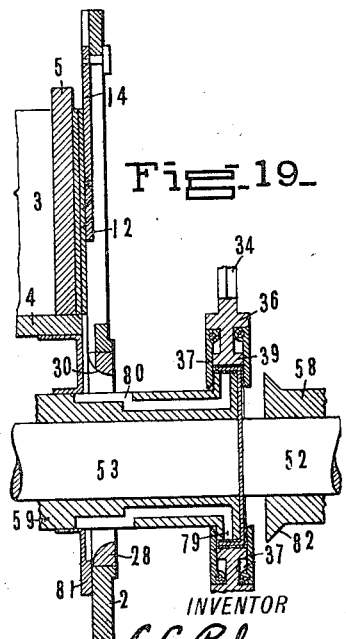
WITNESSES
INVENTOR
L. C. Palmer
BY
Duell, Warfield & Duell
ATTORNEYS

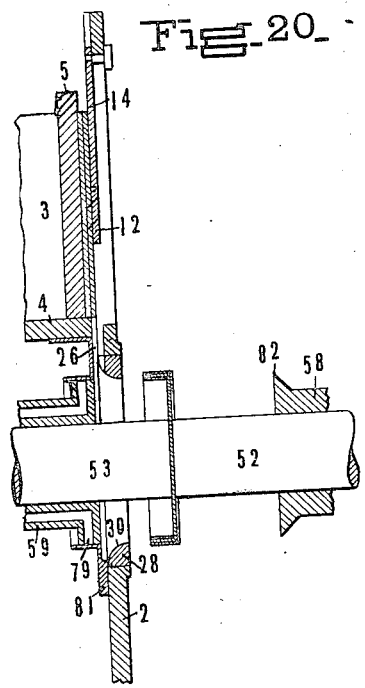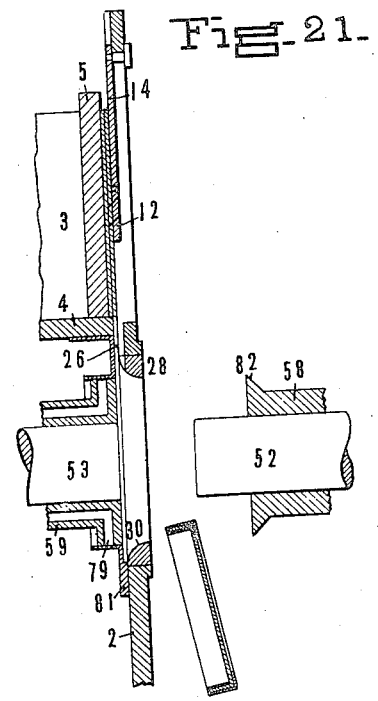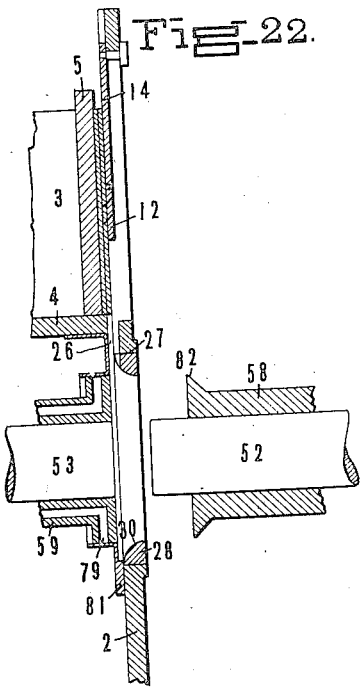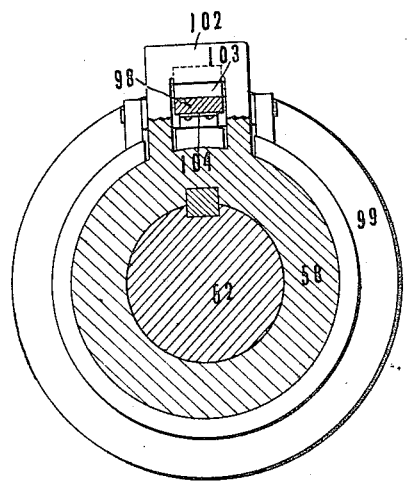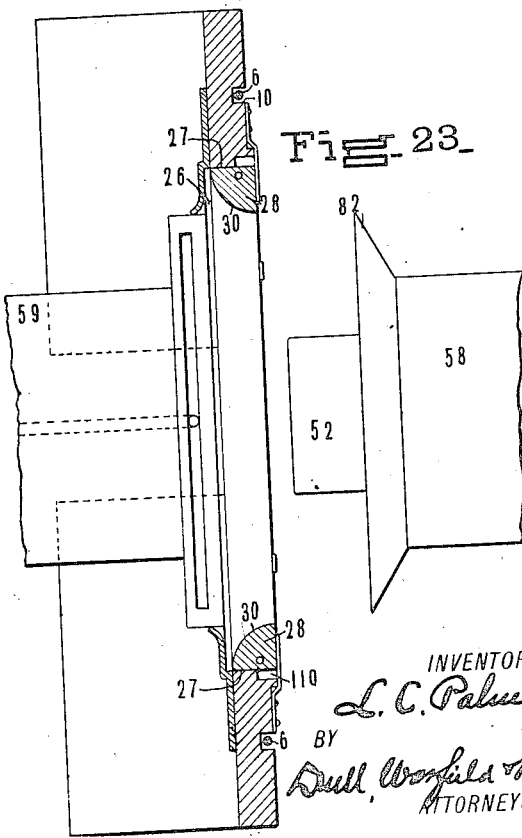

UNITED STATES PATENT OFFICE.

LYNDON C. PALMER, OF BUFFALO, NEW YORK, ASSIGNOR TO THE F. N. BURT COMPANY, LIMITED, OF BUFFALO, NEW YORK, A CORPORATION OF CANADA.

BOX MAKING AND COVERING MACHINE.

1,320,492.   Specification of Letters Patent.   Patented Nov. 4, 1919.

Application filed January 31, 1911, Serial No. 605,749. Renewed April 3, 1919. Serial No. 287,346.

*To all whom it may concern:*

Be it known that I, LYNDON C. PALMER, a citizen of the United States, residing at Buffalo, in the county of Erie and State of New York, have invented certain new and useful Improvements in Box Making and Covering Machines, of which the following is a full, clear, and exact description, such as will enable others skilled in the art to which it appertains to make and use the same.

This invention relates to box machines and especially to machines for forming boxes of paper, cardboard, etc., and covering the same with material of a suitable character, preferably paper.

One object of the invention is the production of a machine for quickly and efficiently forming a paper box from corner cut blanks and covering the same with paper.

Another object of the invention is the provision of a machine for the purpose described which shall be simple in character and highly efficient in use.

Still another object is the production of a machine which will form a box having an attractive appearance, free from irregularities and smooth throughout.

Still other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein similar reference characters refer to similar parts throughout the several views, Figure 1 is a plan view of the machine;

Fig. 2 is a vertical section thereof on the line D—D, Fig. 1;

Fig. 3 is an enlarged vertical section of a portion of the machine showing the magazine, the folding mechanisms and the means for gripping a strip to the box;

Fig. 4 is a horizontal section on the line J—J, Fig. 5.

Fig. 5 is an elevation, partly in section, showing the association of the blank feeding and strip feeding and cutting mechanisms;

Fig. 6 is a vertical section on the line K—K, Fig. 1;

Fig. 7 is a vertical section on the line A—A, Fig. 6;

Fig. 8 is a vertical section on the line F—F, Fig. 1;

Fig. 9 is a cross section through the machine showing a shifting device for one of the mandrels, the section being taken on the line E—E, Fig. 1;

Fig. 12 is a perspective view of the blank from which the boxes are formed;

Fig. 13 is a perspective view of the blank folded into box form;

Figs. 14, 15, 16, 17, 18, 19, 20, 21 and 22 show the machine in successive steps of operation in the formation of a covered box;

Fig. 23 is a horizontal section through a portion of the device; and

Fig. 24 is an elevation, partly in section, showing the gripping finger and its operating relationship with one of the mandrels.

Figure 10:
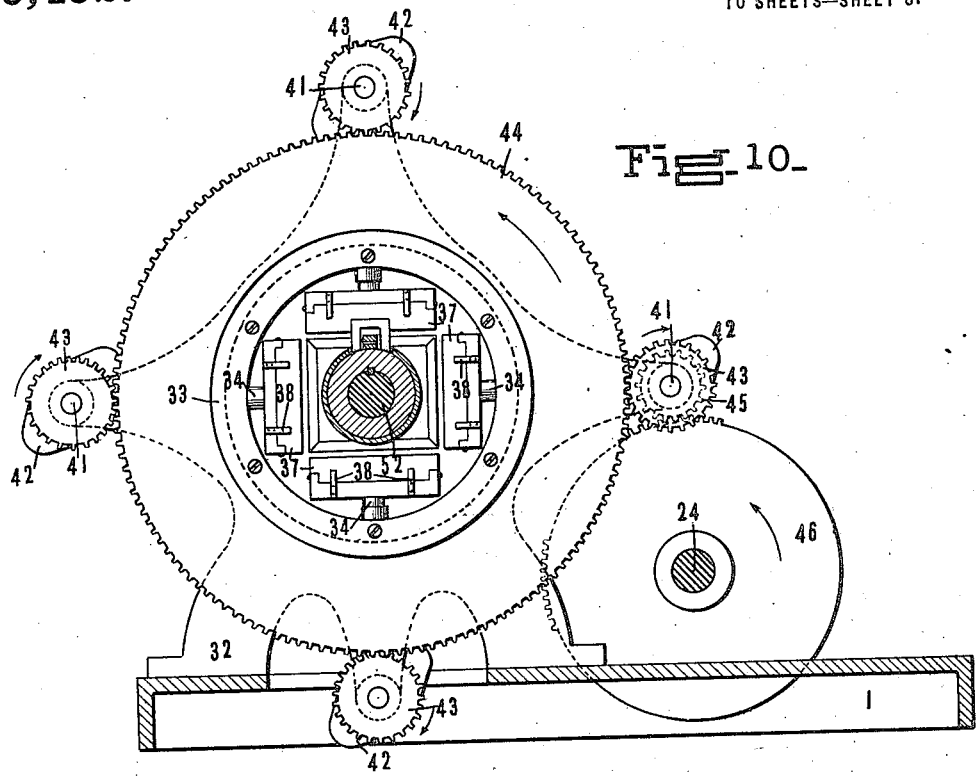
Fig. 10 is a vertical section on the line H—H, Fig. 1, showing the strip folding mechanism and its operating devices.
Figure 11:
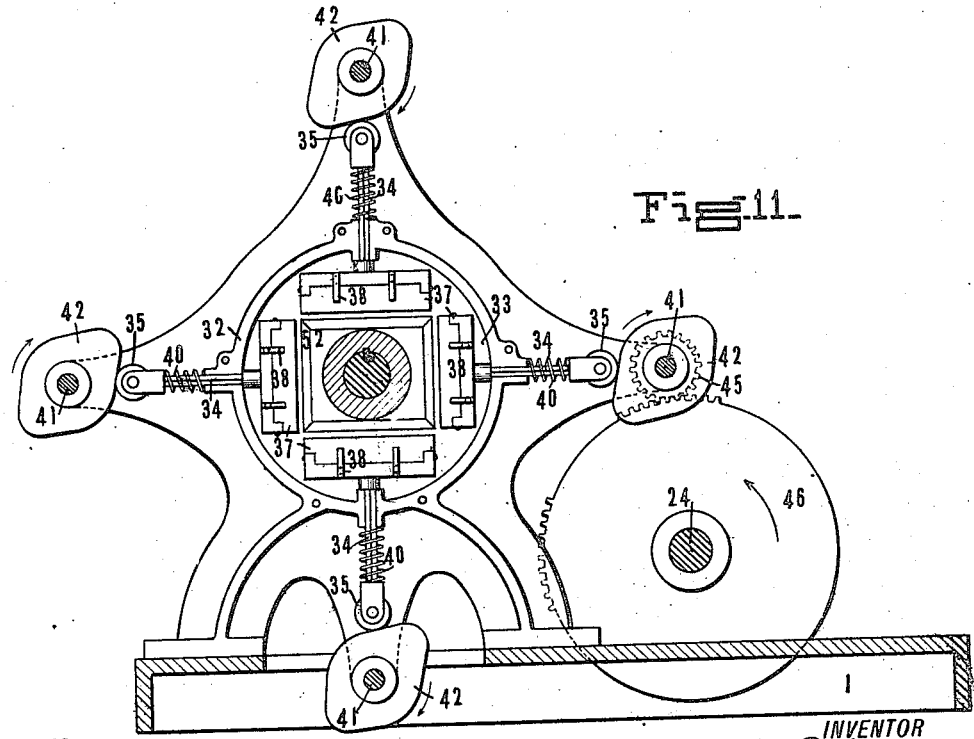
Fig. 11 is a section on the line G—G, Fig. 1, showing the strip folding mechanism more in detail.

By means of the present invention a rectangular paper blank A having corner cut portions, as shown in Fig. 12, is folded on the dotted lines shown in said figure into a box of the shape illustrated in Fig. 13. The blank shown in Fig. 12 is scored along the dotted lines in order to fold easily and accurately. A series of blanks such as shown in Fig. 12 are held in a horizontal magazine and are fed continuously to a feeding or picking mechanism which removes the blanks one by one from the magazine and delivers them before a folding frame, where they rest in vertical position. A longitudinally movable forming mandrel, the head of which is rectangular to conform with the scored lines of the blank, moves against the blank and presses it through the folding frame, the latter folding the sides of the blank over against the sides of the mandrel, thus forming on the mandrel a box. Suitable mechanism is provided to retain the box in its folded condition upon the mandrel. The end of a cover strip from a suitable source of supply, and provided with a suitable adhesive, is pressed upon the surface of the folded sides of the box and held thereon while the mandrel is rotated, by which operation the strip is folded around the sides of the box. Preferably this strip is wider than the box and extends each side thereof, and after it has been folded therearound in the manner explained, it is severed from the supply, the severed end smoothed into place on the box and the mandrel then moved to another folding mechanism and held stationary while a series of folding devices are moved against the sides of the box, folding in the outstanding edges of the strip at right angles to the sides of the box. By this latter operation one side of the strip will be pasted to the bottom or head of the box. Subsequently those sides of the strip which have been folded over the edges of the box are folded into the box and against the inner walls thereof, thus completing the forming operation, the box being subsequently ejected from the machine.

The numeral 1 indicates a table or bed plate which carries the operating part of the machine. Intermediate the ends of the table is a vertically arranged frame piece 2 carrying at a suitable distance above the table one end of a trough or magazine 3 adapted to support a series of blanks. The other end of the magazine is supported upon a standard also extending upwardly from the table. The trough 3 comprises preferably a horizontal bottom portion 4 having upstanding sides within which is located a movable follower plate 5 to which are attached suitable cords 6 provided with weights 7 by means of which the follower plate is drawn from the rear portion of the trough 3 toward its front portion. Preferably the follower plate is provided with arms 8 extending outside the walls of the trough 3, to which the cords 6 are attached, thus providing for the bodily movement of said follower with but slight tendency to any angular movement. The cords 6 extend over guide pulleys 9 at the end of the trough and grooves 10 are provided in the plate 2 along which the cords 6 extend. The delivery or front end of the trough is closed by a portion of the frame and the end of the bottom thereof terminates short of the face plate to provide a slot through which the blanks may pass edgewise from the trough. Preferably the bottom of the trough at this point is provided with an adjustable plate 11, by means of which the width of the slot may be adjusted.

In order to move or deliver the blanks from the magazine a preferably reciprocating feeding mechanism is provided comprising a picker 12 vertically and slidably mounted in a slot 13 in the frame plate 2 at preferably the central transverse line of the trough. In the present instance the picker 12 comprises a plate formed in two portions, the upper portion 14 being slidably mounted in guides on the frame plate 2, as aforesaid, while the lower portion is horizontally pivoted to the upper portion and is provided with downwardly inclined pointed projections or teeth 15. A spring 16 secured to the plate 14 and resting against the plate 12 tends to yieldingly press the picker against the foremost blank in the magazine. The picker is designed to reciprocate up and down in front of the blanks in the magazine and in its upward motion the teeth 15 pass lightly over the surface of the foremost blank, while when the picker moves down the teeth 15 enter the blank and move the same downwardly therewith into a position where it may be further acted upon. The picker is operated through a lever 17 having at one end a slot 18 engaging a pin 19 on the picker, the other end being pivoted on the frame at 20. The lever 17 is caused to oscillate up and down by a suitably supported slide 21 jointed to the lever 17 intermediate its ends and having a roller 22 engaging an internal cam 23 on a drive shaft 24, a spring 25 being attached to the lever and frame to move the former upwardly, the cam being designed to positively cause the descent of the picker. It will be observed that the contour of cam is such as to cause the picker to rapidly descend and immediately ascend, a substantial dwell of the picker intervening the recurrence of these movements.

The blanks are moved by the picker through a guideway 26 in vertical alinement with the slot in the trough, and into position in front of a vertically arranged folding frame or female die 27. In the present instance boxes of rectangular shape are to be formed, and the folding frame or die comprises a set, or series of four folding members 28 and 29, movably mounted opposite each other in pairs and defining an open rectangular structure. Preferably the folding members are pivoted at the sides of a generally rectangular opening in the frame 27, which frame may be the part of the frame plate 2 at this point, and said members have curved or cam faces 30 adapted to not only fold but press the blank as it is passed between said members by mechanism hereinafter described. In the present embodiment the curved surfaces are cylindrical and the members are eccentrically pivoted, that part of the surface with which the blank first contacts being most remote from the pivotal point so that the blank is sharply bent, folded and pressed at the angle of the fold, the pressure varying or gradually decreasing as the blank moves through the frame. The upper folding member is cut away at 31 to accommodate the picker in its descent.

Laterally spaced from the folding frame is another folding mechanism comprising a vertically arranged frame 32 supported on the base plate and having an opening 33 around which is arranged a set, or series of preferably translatable strip folding devices. In the present instance each of the latter folding devices comprises a squared rod 34 mounted to reciprocate in the frame and having an anti-friction roller 35 at its outer end and folding and pressing members at its inner end. Each folding member comprises a head 36, to the opposite sides of which are pivoted fingers 37 spaced apart and pressed toward each other by springs 38. Between the fingers is a presser or block 39, against the sides of which the fingers lie and by which they are kept apart. The rod 34 passes through a squared opening in the frame 32 and is pressed outwardly by a spring 40 engaging at one end a shoulder on the outer end of the rod, its other end contacting with a shoulder in the opening in which the rod lies. Four of the strip folding devices are employed and they are arranged preferably radially around the opening in the frame 32 and are adapted to move toward and from each other across the opening in pairs for the purpose hereinafter described.

Adjacent the outer end of each rod 34 stud shafts 41 are mounted on the frame, a double throw cam 42 being secured to each stud shaft opposite the rollers 35, respectively, the extreme outer throw of the respective portions of each cam being different, one being longer than the other, for a purpose which will be hereinafter apparent. Each stud shaft 41 has a pinion 43 attached thereto, a large gear 44 being journaled on a hub portion of the frame 32 surrounding the opening 33 and meshing with each pinion 43 to rotate the same. As the cams rotate they move the folding fingers across the opening 33 and toward each other twice for every revolution of the cams, the movement due to one cam portion of a single cam 42 being greater than that due to the other cam portion of the same cam 42. One of the stud shafts 41 has an additional pinion 45 which meshes with a large mutilated gear 46 on the main shaft 24 to give motion to the cams 42 at proper times.

After the blanks are delivered in front of the folding members 28 and 29 mechanism is provided for moving them past or between the folding members whereby they are folded or bent into a box, after which a pasted strip is folded over said box. Supported on the bed plate are standards 47 having hollow bearing portions in which rotate hollow sleeves 48 and 49 having squared or angular inner surfaces supporting squared or angular ends 50 and 51 of rotatable and translatable gripping or clamping mandrels. Each of these mandrels comprises a cylindrical inner portion 52 and 53 having shoulders 54 engaged by shifting levers 55 operated by rotary cams 56 and 57 on the main drive shaft 24 to move or translate the mandrels or grippers longitudinally. These mandrels are axially alined in an oppositely disposed pair, and mounted on each respectively at their proximate portions are concentric mandrels 58 and 59 forming another oppositely disposed pair also provided with shoulders engaged by the shifting levers 60, in turn operated by rotary cams 61 and 62 on the main drive shaft, so that they may be shifted, or translated longitudinally with respect to the inner mandrels. The outer mandrels, however, are splined to the inner mandrels so as to rotate therewith. In order to give rotary motion at proper times to the inner mandrels 52 and 53 the sleeves 48 and 49 are provided at their outer ends with pinions 63 and 64 adapted to be operated by large mutilated gears 65 and 66 secured at the ends of the shaft 24, one of said large mutilated gears, in this instance gear 65, being widened and provided with continuous gear teeth which may be driven by any suitable motor to cause the rotation of the shaft 24.

The shifting levers 55 and 60 preferably move in a horizontal plane, being pivoted at their outer ends to standards 67 at the rear portion of the bed plate and extending forwardly over the shaft 24 and being provided intermediate their ends with friction rollers 68 adapted to coöperate respectively with the several rotary cams carried by the shaft 24. It is evident that the shifting levers may be shifted in both directions positively by means of suitable cams on the shaft 24 but in the present embodiment it is preferred to positively shift them in one direction by the cams and in the opposite direction by means of springs 69 and 70. The levers 55 and 60, which operate the mandrels 53 and 59, are preferably connected by the spring 70, an additional spring 71 being secured to the lever 55 and to a bracket 72 on the frame to move the levers 55 and 60 in one direction. The levers 55 and 60, which operate the mandrels 52 and 58, are also preferably connected by the spring 69, an additional spring 73 connected to the lever 60 and to a bracket 74 causing the movement of said levers in one direction. A spring 200 connects arm 100 and the bracket 74.

The mandrels 52, 53, 58 and 59 are substantially centrally alined perpendicularly to the face of the folding frame 27 and the plane of movement of the folding fingers 37 and are adapted to move back and forth between the several folding members. A standard 75 secured to the bed plate or table 1 forms an additional support for the mandrels 52 and 58, the same having at its upper portion a circular bearing surrounding the outer mandrel 58.

The mandrels 53 and 59 also have an additional support consisting of a standard 76 having a bearing portion at its upper end surrounding the circular periphery of the outer mandrel 59 and provided with a passageway 77 therethrough opening into the face of said bearing and adapted to be connected with a suitable fluid exhaust or vacuum forming mechanism by means of a suitable pipe. The passageway 77 communicates with an annular passage 78 in the bearing of the standard 76, said annular passage being continuous around the bearing. The outer mandrel 59 is adapted to slide in the bearing of the standard 76 and has a front flat face or end portion rectangular in contour and of the size of the bottom or head of the box to be formed. The dimensions of the head correspond with the dimensions of that part of the blank embraced within the dotted lines shown in Fig. 12. The sides or peripheral walls of this mandrel are preferably at right angles to its face or head, the sides and head thus comprising a rectangular supporting portion or male die, around which the box is formed. In each side face of the mandrel are ports 79 connected by passageways to elongated ports 80 in the circular periphery of the mandrel. The proportion and construction of the ports 80 are such that when the mandrel 59 is in its extreme rearward position there will be no suction through the ports 79 in the side face of the mandrel, but when the mandrel 59 is advanced the ports 80 will, after a slight movement, register with the channel 78 in the bearing of the standard 76 and air will be drawn through the ports 79 and the passageways in the mandrel by means of the passageway 77, the mandrel 59 having been moved sufficiently at this time to close any communication between the port 80 and the outer air, except through the port 79. Furthermore, on account of the substantial length of the ports 80, after the suction has been once established, further forward movement will not destroy said suction, but said suction will continue and rotary movement of the mandrel 58 will be permitted, the channel 78 providing for the continuation of the suction during the rotary movement.

The operation of shaping and supporting the box will now be described. A series of blanks having been introduced into the magazine 3 and the follower 5 pressing the same forwardly under the influence of the weights, rotation of the shaft 24 will cause the picker 12 to descend and the foremost blank will be fed through the slot at the end of the magazine downwardly into position in front of the folding fingers, its position being determined by an adjustable gage 81. In this position the blank will be substantially parallel to the plane of the folding frame, the sides, or tongues of the blank, formed by the corner cuts, extending beyond the inner edges of the folding fingers, the head of the blank or that portion embraced within the dotted lines shown in Fig. 12, substantially coinciding with the head or flat face of the mandrel 59, which, together with the mandrel 53, are at this time in their retracted positions to the left of the blank, the head of the mandrels 53 and 59 being substantially flush with each other. The blank being in position in front of the folding fingers, cams 57 and 62 cause the shifting levers 55 and 60 to move the mandrel 53 and the forming mandrel 59 forwardly through the folding frame and the sides of the blank will be bent over and pressed against the flat sides of the head and held thereon after being relieved from the folding frame by the exhaust mechanism, hereinbefore described. The cam surface of the folding members will first contact the blank at the outer edge of the side of the head of the mandrel and the tongues or sides of the blank will be firmly pressed against the lateral flat sides of the mandrel and folded thereon, the folding surface of the members rolling over the sides of the blank and, as it were, wiping said sides against the mandrel, thus forming a smooth fold, and at the same time squeezing out any air that might have a tendency to accumulate therebeneath. The mandrels 53 and 59, carrying the folded blank, have now pushed the blank through the frame and the central portion of the head of the box will then contact with the end of the mandrel 52 and the three mandrels will then move further until that part of the head of the box surrounding the mandrel 52 will be pressed against and supported by the plane rectangular end of the mandrel 58. The end of the mandrel 58 is beveled at 82 in order to offer as little surface as possible for retaining glue, paste, etc., which is used in subsequent operations. In this position the box will be gripped between the mandrels 52 and 53 as well as supported by the mandrels 58 and 59, and will be so disposed relatively to the folding frame and the folding fingers that it may rotate without being impeded by said mechanisms. A cover strip of suitable material, in this instance paper, is now applied to the sides of the box, being preferably held thereon by means of glue or other adhesive material. The mechanism for feeding and applying the strip to the box comprises a web or strip of paper 83 leading from a suitable supply and passing in contact with a suitable glue or paste applying device whereby its lower surface is coated with an adhesive. Extending laterally from the box when in strip applying position, is a platform 84 having a strip feeding slide or shuttle 85 embracing the strip at a distance from its front or affixing end.

This shuttle is adapted to slide back and forth in a groove in the platform, the strip 83 being guided by a rearwardly curved arm 86 thereof and being lightly held and clasped by a spring finger 87 which presses the strip in contact with a flat portion 88 of the shuttle. It will be seen that the shuttle is in the nature of a narrow finger of substantially the width of the strip, and as it plays back and forth over the platform 84 it advances the end of the strip into position over the sides of the box and when the latter is gripped to the box the shuttle withdraws, sliding over the strip, the tension between the spring 87 and the part 88 being sufficient to feed the strip forwardly, but insufficient to withdraw the strip when suitably held in position on the box. The reciprocating motion of the shuttle is accomplished by means of a link 89 pivotally connected with the shuttle at one end and to an arm of a bell crank lever 90 at its other end, movement of the bell crank lever being accomplished by a vertically reciprocating slide 91 having a roller at its lower end engaging a cam on the shaft 24, said slide being pivotally jointed to an arm of the bell crank lever 90. A spring 92 connected to the bell crank lever 90 and the frame, causes the movement of the shuttle in one direction. The front end of the platform 84 forms a shear blade and is located substantially in line with the side of the box when said side is in vertical position, and immediately over said plate and consequently over the strip fed thereover, is supported a knife or co-operating shear blade 93 mounted to reciprocate in a guideway 94 secured to the frame and operated by means of a lever 95 pivotally mounted on the frame and having an arm 96 coöperating with a cam 97 on the same cam wheel as the cam 23.

The cover strip having been fed by the shuttle and its end having been positioned over the side of the box, said end is pressed on and held against the side of the box by a gripper finger 98 carried on a sleeve 99 concentrically mounted on the mandrel 58. The sleeve 99 is longitudinally movable with respect to the mandrel 58, said movement being accomplished by means of the shifting lever 100 pivotally mounted on a standard on the bed plate and having an antifriction roller coöperating with a rotary cam 101 on the shaft 24 so that at the proper time said sleeve is moved to carry the gripping finger 98 over the end of the cover strip and press the same against the box. Preferably the finger 98 is pivotally connected at the base of the sleeve 99 and extends forwardly within and beneath a guiding yoke 102 carried by the mandrel 58. Said yoke is provided with an inner cam face against which a cam or incline 103 near the inner end of the gripper finger 98 contacts, said gripper finger being normally held in upper position by means of a light spring 104. It will now be seen that as the sleeve 99 is moved longitudinally with respect to the mandrel 58, not only will the end of the gripper 98 be moved over the end of the cover strip, but by reason of the contact of its cam strip 103 with the cam 102, its outer end portion will be depressed and will move the end of the strip into engagement with the side of the box and press the same thereagainst. Furthermore, the sleeve 99 is permitted to rotate as well as translate, and such rotation is accomplished by reason of the engagement of the sides of the gripper finger with the sides of the yoke on the mandrel.

Immediately above the position assumed by the box preliminary to its rotation to fold the strip therearound, a presser roller 105 is located, the same being secured at the end of an arm 106 pivoted to the frame and pressed toward the box by a spring 107, its downward movement being limited by a stop 108. At this point it may be noted that a spring 109 is fastened at one end to the lever 95 and at its other end to the frame to cause movement of the knife 93 in one direction.

The end of the cover strip having been moved by the shuttle into position over the box, the finger 98 is advanced by its operating mechanism and its end moves the strip into contact with the box and grips the same thereto. This having been accomplished, the teeth of the mutilated gears 65 and 66 engage the pinions 63 and 64 to cause a single rotation of the mandrels. During said rotation the box is likewise rotated and the cover strip folded around the sides of the box and over its corners, thus firmly binding the sides of the box in position at right angles to the head thereof by means of the pasted strip. One rotation of the box having been accomplished, the knife 93 then descends and severs the strip at the corner of the box, whereupon a second rotation of the mandrels occurs and the trailing end of the strip is rolled down on the box, the roller 105 pressing and smoothing the pasted strip during each rotation. The steps in the above described operation, from feeding the blank to folding the strip therearound, are clearly shown in Figs. 14, 15 and 16, which represents the position of the parts at different stages of operation.

After the second rotation of the box and the mandrels has been completed, rotary motion ceases and the rotary cams on the shaft 24 cause the mandrels 52, 53 and 58 to move to the right (in Fig. 2), carrying the box into position in the opening 33 in line with the sides of the folding fingers, the sides of the box being presented squarely to the respective folding fingers. At the same time the mandrel 58 continues its motion and separates from the box sufficiently to permit the folding fingers to enter between the same and the box. The box having been moved to the position last stated, one set of folding fingers, comprising those located diametrically opposite each other, moves toward the box and fold the sides of the strip against the bottom of the box and across the edge of the box. These fingers then at once retreat and the other set similarly folds the remaining sides of the strip onto the bottom and across the edge of the box (see Fig. 17). The mandrels 58 and 59 now move toward the box, the latter pressing against the outside thereof and the former entering the box, carrying with it the sides of the cover strip which now extend across the edges of the box, thus folding the cover strip into the box and pressing the same against the inside walls thereof (see Fig. 18). The mandrel 58 then retreats and the folding fingers once more move toward the box, but at this time they are moved toward the box by the other portion of the cam 42, being thus thrust further toward the box so that the head or block 39 contacts with the outside of the box and a substantial pressure is given to the folded parts of the box by means of said block and the mandrel 59, which is in position therein (see Fig. 19). After the pressing operation the mandrel 58 retreats once more and the mandrels 52, 53 and 59 are moved by their operating mechanisms toward the left (in Fig. 2), the mandrel 59 moving more rapidly than the mandrel 53, thus being withdrawn from the box so that the completed box, when it shall have reached a position between the folding frame and the folding fingers, will be supported only by the mandrels 52 and 53. At this time the mandrel 52 ceases its leftward movement but the mandrel 53 continues to move until it reaches a position with its end flush with the end of the mandrel 59, and the mandrels 52 and 53 being thus separated the box is released and drops from the machine into a suitable receptacle (see Figs. 20, 21 and 22). The mandrel 58 now moves once more to the left to the position which it originally occupied (as in Fig. 2), whereupon another box forming and folding operation may take place.

The folding members 28 and 29 may be secured in the frame 2 in any suitable manner, but preferably the face of the frame is slotted as at 110, forming double shoulders 111 at each corner of the opening in the frame 2. the pivots of the folding members 28 and 29 resting in recesses in said shoulders and secured by cover plates 112 fastened to the frame at each corner over the shoulders, set screws 113 being adapted to be turned up against the pivots to prevent lateral play thereof.

It will be observed that the machine is rendered compact and eminently practical by the relative disposition of the folding mechanisms and the supporting and operating mechanisms. Preferably the drive shaft 24 is arranged parallel with but below the axis of the mandrels, the shifting levers extending substantially horizontally across the drive shaft, and the operating cams are secured to the drive shaft opposite the shifting levers, and the operating cams of the picker, the strip feeder and the cutter are also secured to said shaft. Movement is also preferably communicated to the mandrels to rotate the same at proper times by means of the mutilated gears 65 and 66, secured to said shaft 24. The mutilated gear 46 is also secured to the shaft 24, and has two sets of teeth spaced apart, each set of such length as to turn the cams 42 of the folding devices one-half a revolution at proper intervals, as hereinbefore described.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In an apparatus of the character described, in combination, means for supporting a blank, a folding member, means for moving the blank with respect to the folding member to fold the blank, and means to vary the pressure of the folding member on the blank in the folding operation.

2. In an apparatus of the character described, in combination, means for supporting a blank, spaced folding members defining an opening, means for moving the blank through the opening in contact with the folding members to fold the blank, and means to vary the pressure of the folding members on the blank in the folding operation.

3. In an apparatus of the character described, a folding frame comprising spaced movably mounted members having cam folding faces and springs adapted to yieldingly resist movement of said members.

4. In an apparatus of the character described, in combination, a male die, a female die, means adapted to support a blank therebetween, means to move the dies relatively to each other to fold the blank around the sides of the male die, and means to variably press successive portions of the folded part of the blank against the male die.

5. In an apparatus of the character described, in combination, means for supporting a blank, a folding frame having an opening therein, means for moving the blank through the opening to fold the same, and means to pneumatically retain the blank in folded condition.

6. In an apparatus of the character described, in combination, a folding frame comprising spaced pivoted folding members, a former on which a blank is adapted to be folded, a blank support, means to move the former to carry the blank past the folding members to fold the blank on the former, and means to pneumatically retain the blank in folded condition on the former.

7. In an apparatus of the character described, in combination, means for supporting a blank, a former having a passageway opening into its face adapted to be connected with an exhaust mechanism, a folding member, means for moving the former to carry the blank by the folding member and fold the same on the face of the former, and means to vary the pressure of the folding member on the blank in the folding operation.

8. In an apparatus of the character described, in combination, means for supporting a blank, a former having a passageway opening into its face and adapted to be connected with an exhaust mechanism, a folding member, means to cause relative movement of the blank and folding member past and in contact with each other to fold the blank on the face of the former over the opening comprising means to press successive portions of the folded part of the blank against the face of the former having the opening.

9. In an apparatus of the character described, in combination, a folding frame comprising spaced pivoted folding members having cam faces, a former on which a blank is adapted to be folded and having openings in its face adapted to be connected with a fluid exhaust mechanism, and means for moving the former to carry a blank past and in contact with the folding members to fold the blank on the face of the former over the openings, said cam faces being so shaped as to operate on said blank with a gradually decreasing pressure.

10. In an apparatus of the character described, in combination, a folding frame defining an opening, a former adapted to pass through said opening, and having passageways opening into its face, means to support a blank larger than the opening between the frame and former in line with the opening, means to operate the former to press the blank through the opening with a wiping action and fold the same over the orifices in the face of the former, an exhaust mechanism, and means whereby the movement of the former connects the passageways of the former with the exhaust mechanism.

11. In an apparatus of the character described, in combination, a mandrel having faces to receive a folded box blank, and passageways opening into said faces, means to fold a blank on the mandrel into box shape, exhaust mechanism adapted to be connected with the passageways to retain the blank in folded condition on the mandrel, means to secure a cover strip to the folded blank, and means to rotate the mandrel to fold the strip around the folded blank.

12. In an apparatus of the character described, in combination, a mandrel adapted to support a box, a clamping mandrel concentric thereto, and means adapted to positively cause simultaneous rotation of said mandrels and the box clamped thereto.

13. In an apparatus of the character described, in combination, a mandrel adapted to support a box, a clamping mandrel concentric thereto, and means adapted to cause positive translation and rotation of said mandrels with the box clamped thereto.

14. In an apparatus of the character described, in combination, a supporting bearing provided with a port, a mandrel adapted to be translated in said bearing and having ports in its exterior and bearing faces and passageways connecting said ports, and means adapted to reciprocate the mandrel and cause its bearing port to move into and out of registry with the port in the supporting bearing.

15. In an apparatus of the character described, in combination, a supporting bearing provided with a port and a passageway around the bearing communicating with said port, a mandrel adapted to be translated in said bearing and having ports in its exterior and bearing faces and passageways connecting said ports, and means adapted to reciprocate the mandrel and cause its bearing port to move into and out of registry with the port in the supporting bearing.

16. In an apparatus of the character described, in combination, a supporting bearing provided with a port and a passageway around the bearing communicating with said port, a mandrel adapted to be translated and rotated in said bearing and having ports in its exterior and bearing faces and passageways connecting said ports, and means adapted to translate and rotate said mandrel to cause its bearing port to move into and out of registry with the port in the supporting bearing comprising mechanism to retain the respective ports in registry while the mandrel is rotated.

17. In an apparatus of the character described, in combination, supporting and clamping mandrels adapted to be translated and rotated, a stationary frame comprising folding members laterally disposed with respect to the axis of the mandrels, translatable folding members laterally disposed with respect to the axis of the mandrels, means for causing longitudinal movment of the mandrels with respect to the folding numbers, and means for moving the translatable folding members toward and from the axis of the mandrels.

18. In an apparatus of the character described, in combination, a stationary frame comprising spaced folding members, translatable folding members spaced therefrom and from each other, means comprising a forming mandrel adapted to move a blank through the stationary frame and into the space between the sets of folding members thereby folding the blank into a box, a second mandrel adapted to clamp the box between itself and the first mandrel, means adapted to affix a cover strip to the box while on said forming mandrel, means to rotate the forming mandrel to fold the strip around the box, means to move said mandrels to dispose the stripped box in the space between the translatable folding members, and means to move the latter folding members toward the box to fold the edges of the strip onto the box.

19. In an apparatus of the character described, in combination, a stationary frame comprising spaced folding members, translatable folding members spaced therefrom and from each other, means adapted to move a blank through the stationary frame thereby folding the blank into a box, means adapted to affix a cover strip to the box, means to sever the strip, means to rotate the box to fold the strip therearound, means to move the stripped box into the space between the translatable folding members, and means to move the latter folding members toward the box to fold the edges of the strip into the box.

20. In an apparatus of the character described, in combination, a box support, pairs of folding devices radially supported therearound and comprising spring pressed rods, cams adapted to coöperate with each rod respectively and move the same in opposition to the springs, and means to rotate the cams to cause successive operation of the pairs of folding devices.

21. In an apparatus of the character described, in combination, a box support, pairs of folding and pressing devices radially supported with respect thereto, a cam for each folding and pressing device, and means whereby rotation of the cam causes alternate folding and pressing operations of each pair of said devices.

22. In an apparatus of the character described, in combination, a box support, a combined folding and pressing device adapted to move toward and from the support, and means to automatically vary the throw of said device.

23. In an apparatus of the character described, in combination, a box support, a plurality of folding and pressing devices disposed therearound comprising rods movable toward and from the box, a single cam for each folding and pressing device, and means for simultaneously operating said cams to alternately fold and press.

24. In an apparatus of the character described, in combination, a box support, a plurality of folding and pressing devices disposed therearound and comprising rods movable toward and from the box, stud shafts adjacent each folding and pressing device, a cam on each stud shaft adapted to coöperate with its respective rod to cause both the folding and the pressing operation, gears on each stud shaft, a gear meshing with the latter gears, a second gear on one of the stud shafts, and means to rotate the last mentioned gear.

25. In an apparatus of the character described, in combination, a box support, a plurality of folding and pressing devices disposed therearound and comprising rods movable toward and from the box, stud shafts adjacent each folding and pressing device, a cam on each stud shaft adapted to coöperate with its respective rod to cause both the folding and the pressing operation, gears on each stud shaft, a gear meshing with the latter gears, a second gear on one of the stud shafts, and a mutilated drive gear adapted to mesh with said last mentioned gear.

26. In an apparatus of the character described, in combination, box forming and covering mechanism comprising mandrels arranged in alinement in concentric pairs, and folding devices disposed around the mandrels, means adapted to move alined mandrels to grip a box, means to rotate the mandrels when in gripping position, and means adapted to move the other mandrels independently while said former mandrels are in gripping position.

27. In an apparatus of the character described, in combination, a pair of oppositely disposed rotatable and translatable gripping mandrels, a pair of supporting mandrels on the gripping mandrels, respectively, to rotate therewith and translatable independently relative thereto, a stationary folding mechanism and a translatable folding mechanism disposed laterally of the mandrels, means adapted to translate the mandrels, and means to rotate the mandrels.

28. In an apparatus of the character described, in combination, a pair of oppositely disposed rotatable and translatable gripping mandrels, a pair of supporting mandrels on the gripping mandrels, respectively, to rotate therewith and translatable independently relative thereto, a stationary folding mechanism and a translatable folding mechanism disposed laterally of the mandrels, means adapted to translate the mandrels independently, and means to rotate the mandrels.

29. In an apparatus of the character described, in combination, a pair of oppositely disposed rotatable and translatable gripping mandrels, a pair of supporting mandrels on the gripping mandrels, respectively, to rotate therewith and translatable independently relative thereto, a stationary folding mechanism and a translatable folding mechanism disposed laterally of the mandrels, means adapted to translate the mandrels independently, and means to rotate the mandrels in pairs.

30. In an apparatus of the character described, in combination, a pair of oppositely disposed rotatable and translatable gripping mandrels, a pair of supporting mandrels on the gripping mandrels, respectively, to rotate therewith and translatable independently relative thereto, a stationary folding mechanism and a translatable folding mechanism disposed laterally of the mandrels, means adapted to translate the mandrels independently, and means to rotate the mandrels in concentric pairs.

31. In an apparatus of the character described, in combination, a rotatable forming mandrel, a concentric gripper axially movable relative thereto, a rotatable supporting mandrel axially alined with said forming mandrel, a second gripper concentric with and axially movable relative to said supporting mandrel, means adapted to rotate said forming and said supporting mandrels, means adapted to axially move the same, and means adapted to axially move said grippers.

32. In an apparatus of the character described, in combination, a rotatable forming mandrel, a concentric gripper axially movable relative thereto, a rotatable supporting mandrel axially alined with said forming mandrel, a second gripper concentric with mandrel, and axially movable relative to said supporting mandrel, means adapted to simultaneously rotate said forming and said supporting mandrels, means adapted to axially move the same toward and from each other, and means adapted to axially move said grippers toward and from each other.

33. In an apparatus of the character described, in combination, a rotatable forming mandrel, a concentric gripper rotatable therewith and axially movable relative thereto, a rotatable supporting mandrel axially alined with said forming mandrel, and a second gripper concentric with said supporting mandrel, rotatable therewith, and axially movable relative thereto.

34. In an apparatus of the character described, in combination, a rotatable, axially movable forming mandrel, a concentric movable gripper rotatable therewith and axially movable relative thereto, a rotatable, axially movable supporting mandrel axially alined with said forming mandrel, and a second gripper concentric with said supporting mandrel, rotatable therewith, and axially movable relative thereto.

35. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to rotate said mandrels and grippers at predetermined times, and means adapted to cause said elements to move axially at predetermined times.

36. In an apparatus of the character described, in combination, a rotatable, axially reciprocable forming mandrel having a pneumatic gripping face, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to rotate said mandrels and grippers at predetermined times, means adapted to cause said elements to move axially at predetermined times, means associated with said forming mandrel adapted to cause a blank to be folded thereon, and means connected with said face to pneumatically retain the blank in folded condition thereon.

37. In an apparatus of the character described, in combination, a bearing having an inner circumferential recess, a rotatable, axially reciprocable forming mandrel mounted in said bearing and having a pneumatic gripper face, a port in said mandrel adapted to communicate with said recess, a passageway connecting said port and said face, a concentric gripper rotatable with said mandrel and axially reciprocable relative thereto, a rotatable, axially reciprocable supporting mandrel axially alined with said forming mandrel, a second axially reciprocable rotatable gripper axially alined with said first-mentioned gripper, means adapted to rotate said mandrels and grippers at predetermined times, means adapted to cause said elements to move axially at predetermined times, and means associated with said forming mandrel adapted to cause a blank to be folded on said gripper face.

38. In an apparatus of the character described, in combination, a rotatable, axially reciprocable forming mandrel, a concentric gripper rotatable therewith and axially reciprocable relative thereto, a rotatable axially reciprocable supporting mandrel axially alined with said forming mandrel, a second axially reciprocable rotatable gripper axially alined with said first-mentioned gripper, means adapted to feed blanks between said mandrels and said grippers, folding devices disposed on opposite sides of the axes of said mandrels and said grippers, and means adapted to move said forming mandrel between said folding devices.

39. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrels and said grippers, folding devices disposed on opposite sides of the axes of said mandrels and said grippers, and means adapted to move said forming mandrel and its concentric gripper simultaneously between said folding devices.

40. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrels and said grippers, pivoted folding devices having curved eccentric faces disposed on opposite sides of the axes of said mandrels and said grippers, and means adapted to move said forming mandrel and its concentric gripper simultaneously between said folding devices.

41. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable, rotatable gripper axially alined with said first-mentioned gripper, means adapted to feed blanks between said mandrels and said grippers, pivoted folding devices having curved eccentric faces disposed on opposite sides of the axes of said mandrels and said grippers, means adapted to move said forming mandrel between said folding devices, and pneumatic means adapted to retain folded condition of said blanks on said forming mandrel.

42. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrels and said grippers, folding devices disposed on opposite sides of the axes of said mandrels and said grippers, means adapted to move said forming mandrel between said folding devices to and against said supporting mandrel and to the second concentric gripper, means adapted to apply a cover strip to the folded blank, and means to simultaneously rotate said mandrels and grippers to wind said strip on the folded blanks.

43. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrels and said grippers, folding devices disposed on opposite sides of the axes of said mandrels and said grippers, means adapted to move said forming mandrel between said folding devices to and against said supporting mandrel and to the second concentric gripper, means adapted to apply a cover strip to the folded blank, means to simultaneously rotate said mandrels and grippers to wind said strip on the folded blank, means to sever said strip, and means to again rotate said mandrels and grippers.

44. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrels and said grippers, folding devices disposed on opposite sides of the axes of said mandrels and said grippers, means adapted to move said forming mandrel between said folding devices to and against said supporting mandrel and to the second concentric gripper, means adapted to apply a cover strip to the folded blank, means to simultaneously rotate said mandrels and grippers to wind said strip on the folded blank, a second series of folding devices disposed on opposite sides of the axes of said mandrels and grippers, means adapted to axially move said grippers to position opposite said second folding devices and space said forming and said supporting mandrels from said blank, and means to move said folding devices toward said axes and fold the edges of said strip across the edges of the folded portion of said blank.

45. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrel and said grippers, folding devices disposed on opposite sides of the axes of said mandrels and said grippers, means adapted to move said forming mandrel between said folding devices to and against said supporting mandrel and to the second concentric gripper, means adapted to apply a cover strip to the folded blank, means to simultaneously rotate said mandrels and grippers to wind said strip on the folded blank, a second series of folding devices disposed on opposite sides of the axes of said mandrels and grippers, means adapted to axially move said grippers to position opposite said second folding devices and space said forming and said supporting mandrels from said blank, means to move said folding devices toward said axes and fold the edges of said strip across the edges of the folded portion of said blank, and means to then move said forming mandrel past the folded edge of the strip and into the folded blank, and said supporting mandrel against the opposite folded edge of said strip, thereby folding one edge of the strip and pressing the other.

46. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrels and said grippers, folding devices disposed on opposite sides of the axes of said mandrels and said grippers, means adapted to move said forming mandrel between said folding devices to and against said supporting mandrel and to the second concentric gripper, means adapted to apply a cover strip to the folded blank, means to simultaneously rotate said mandrels and grippers to wind said strip on the folded blank, a second series of folding devices disposed on opposite sides of the axes of said mandrels and grippers, means adapted to axially move said grippers to position opposite said second folding devices and space said forming and said supporting mandrels from said blank, means to move said folding devices toward said axes and fold the edges of said strip across the edges of the folded portion of said blank, means to then move said forming mandrel past the folded blank, and said supporting mandrel against the opposite folded edge of said strip, thereby folding one edge of the strip and pressing the other, and means adapted to press the strip against the folded portion of said blank while the forming mandrel is in its last-mentioned position in the blank.

47. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrels and said grippers, folding devices disposed on opposite sides of the axes of said mandrels and said grippers, means adapted to move said forming mandrel between said folding devices to and against said supporting mandrel and to the second concentric gripper, means adapted to apply a cover strip to the folded blank, means to simultaneously rotate said mandrels and grippers to wind said strip on the folded blank, a second series of folding devices disposed on opposite sides of the axes of said mandrels and grippers, means adapted to axially move said grippers to position opposite said second folding devices and space said forming and said supporting mandrels from said blank, means to move said folding devices toward said axes and fold the edges of said strip across the edges of the folded portion of said blank, means to then move said forming mandrel past the folded edge of the strip and into the folded blank, and said supporting mandrel against the opposite folded edge of said strip, thereby folding one edge of the strip and pressing the other, means adapted to press the strip against the folded portion of said blank while the forming mandrel is in its last-mentioned position in the blank, and means to move the grippers to carry the blank into discharging position and the forming mandrel out of the folded blank.

48. In an apparatus of the character described, in combination, a rotatable, axially reciprocable forming mandrel, a concentric gripper rotatable therewith and axially reciprocable relative thereto, a rotatable, axially reciprocable supporting mandrel axially alined with said forming mandrel, a second axially reciprocable rotatable gripper axially alined with said first-mentioned gripper, means adapted to feed blanks between said mandrels and said grippers, folding devices disposed on opposite sides of the axes of said mandrels and said grippers, means adapted to move said forming mandrel between said folding devices to and against said supporting mandrel and to the second concentric gripper, means adapted to apply a cover strip to the folded blank, means to simultaneously rotate said mandrels and grippers to wind said strip on the folded blank, a second series of folding devices disposed on opposite sides of the axes of said mandrels and grippers, means adapted to axially move said grippers to position opposite said second folding devices and space said forming and said supporting mandrels from said blank, means to move said folding devices toward said axes and fold the edges of said strip across the edges of the folded portion of said blank, means to then move said forming mandrel past the folded edge of the strip and into the folded blank, and said supporting mandrel against the opposite folded edge of said strip, thereby folding one edge of the strip and pressing the other, means adapted to press the strip against the folded portion of said blank while the forming mandrel is in its last-mentioned position in the blank, means to move the grippers to carry the blank into discharging position and the forming mandrel out of the blank, and means to separate the grippers to free the blank therefrom.

49. In an apparatus of the character described, in combination, a mandrel having a pneumatic gripper face, means adapted to fold a blank on the mandrel and dispose folded portions thereof on said pneumatic gripper face, whereby the blank is retained in folded condition, and means adapted to coöperate with said mandrel to cause the folding of a cover strip around the pneumatically retained portions of the folded blank.

In testimony whereof I affix my signature in the presence of two witnesses.

LYNDON C. PALMER.

Witnesses:
FRANK E. DRULLARD,
CHARLES B. LANG, Jr.